United States Patent Office 3,551,464
Patented Dec. 29, 1970

3,551,464
ESTERIFICATION
Eugene J. Miller, Jr., Wheaton, Ill., and Ago Mais, Trenton, N.J., assignors, by mesne assignments, to Armour Industrial Chemical Company, a corporation of Delaware
No Drawing. Filed Apr. 12, 1967, Ser. No. 630,189
Int. Cl. C11c *3/00*
U.S. Cl. 260—410.6
8 Claims

ABSTRACT OF THE DISCLOSURE

Long chain aliphatic acids and esters are esterified or transesterified with polyols to form the polyol monoester in high yield utilizing large excesses of HF as the catalyst and as the reaction media.

---

This invention relates to esterification including direct as well as transesterification and more particularly to esterification of aliphatic acids and aliphatic acid esters with polyols using hydrogen fluoride (HF) as the catalyst to form monoesters. Higher yields than any heretofore possible of the monoesters are obtained.

The esterification of acids including fatty acids with glycerol using a fluoride-type catalyst is known. A comprehensive treatise of such is found in the Journal of the American Oil Chemist's Society, volume 25, page 335 et seq. (1948). Catalysts, such as $ZnF_2$, $FeF_2$, KF, $SbF_3$, $BiF_3$, $PbF_4$ $CoF_2$, $KHF_2$, $CaF_2$, $AlF_3 \cdot H_2O$, $NiF_2$, $$KTiF_5 \cdot H_2O$$

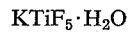
$MnF_2$, $CrF_3$, $CoF_2 \cdot 2H_2O$ are effective. Of these, $SbF_3$, $NiF_2$ and $CoF_2 \cdot 2H_2O$ were outstandingly effective. Hydrofluoric acid (HF) has also been used, see Encyclopedia of Chemical Technology, Interscience Encyclopedia, Inc., New York, N.Y., volume 5, page 788 (1950). None of these catalysts have been good with respect to conversion to the monoester, probably because in utilizing a polyol, such as glycerol, the mono-, the di- and the triesters are all formed in chemical equilibrium with each other and with the starting reactants. The same comments apply with respect to transesterification (ester interchange). Here, sodium soaps were the customary catalyst. However, only a 45% to 55% conversion to monoester is realized.

Attempts to improve this conversion, such as in the Girdler process, have been only moderately successful. The conversion is improved (to 65%) by killing the catalyst at the appropriate time in the reaction before final attainment of the equilibrium mixture of esters. Still, there is substantial room for improvement.

An object of this invention is to provide a novel esterification process.

Another object of this invention is to provide an esterification process which is specific to monoester formation and therefore has better yields than heretofore of the monoesters.

Still another object is to provide an esterification process which results in improved product; secifically, a purer product.

Other objects of the invention will in part be obvious and will in part appear hereinafter.

It has now been found that long chain aliphatic acids and esters may be esterified or transesterified with polyols to form, in very high yield, the polyol monoester, if anhydrous hydrogen fluoride is utilized not only as the catalyst, but also as the solvent for the reaction. For example, the glycerol monoester of a $C_{12}$–$C_{15}$ branched chain aliphatic acid may be obtained in 93.5% yield having a 98% monoester content. Similarly, glyceryl monostearate of 98.5% purity may be obtained in 97.5% yield from glycerol and hydrogenated tallow (essentially glyceryl tristearate).

The direct esterification of an acid with a polyol may be represented as follows:

FORMULA I

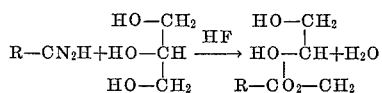

The transesterification of a polyester with a polyol may be represented as follows:

FORMULA II

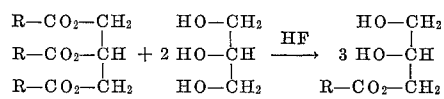

where R in Formulas I and II comprises a long chain alkyl radical.

In the direct esterification, either a normal, saturated straight chain acid, or a branched chain acid, may be used. The graphic structure of the straight chain acids may be represented as follows:

FORMULA III

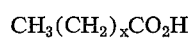
$$CH_3(CH_2)_xCO_2H$$

where $x = 6$ to 20.

The branched chain acids may be those produced by carboxylation of olefins such as manufactured by Shell Oil Company, Emeryville, California. The graphic structure of such acids may be represented as follows:

FORMULA IV

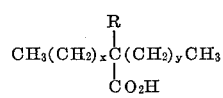

where R is a member of the group consisting of hydrogen and a methyl radical, $x+y=3$ to 26 when R=H, and 2 to 25 when R=—$CH_3$ In the transesterifiaction process, the fatty acid esters that may be utilized are those generally found in animal and vegetable fats and oils such as lard, neatsfoot, tallow (both beef and mutton), herring oil, menhaden oil, sardine oil, sperm (both body and head), whale oil, babassu oil, caster oil, coconut oil, corn oil, cottonseed oil, linseed oil, olive oil, oiticica oil, palm oil, palm kernel oil, peanut oil, perila oil, rapeseed oil, safflower oil, sesame oil, soybean oil, and tung oil and preferably the hydrogenated derivatives of the above oils and fats.

Where there is unsaturation in the acid or ester utilized, polymerization frequently occurs in addition to the monoesterification of this invention.

Individual fatty acid esters, such as glyceryl tripalmitate, glyceryl tristearate, glyceryl trioleate, trilinolein, trilinolenin, trioleostearin, triricinolein, α-palmito-β, γ-distearin, β-palmito-α, γ-distearin, and others, may also be used.

The polyols that may be used in both esterification processes are ethylene glycol, propylene glycol, butylene glycol, trimethylene glycol, tetramethylene glycol, glycerol, 1,2-propanediol, 1,6-hexanediol, trimethylolpropane, and the other polyhydroxy alcohols.

In all cases, excellent conversion to greater than 90% monoesters can be obtained.

In general, the reaction conditions for both esterification and transesterification may be summarized as follows:

TABLE 1.—REACTION VARIABLES

| | Broad range | Preferred range |
|---|---|---|
| Time | 10 min.–6 hrs | 30 min.–2 hrs. |
| Temperature | 20°–85° C | 35°–70° C. |
| Molar ratio: | | |
| Acid to polyol | 1:2.0–1:10 | 1:2.1–1:3.0. |
| Acid to HF | 1:50–1:150 | 1:90–1:110. |

The invention accordingly comprises the several steps and the relation of one or more of such steps with respect to each of the others thereof, which will be exemplified in the process hereinafter disclosed, and the scope of the invention will be indicated in the claims.

For a fuller understanding of the nature and objects of the invention, reference is now made to the following examples:

EXAMPLE I

Esterification of glycerol with oleic acid

A 300 mol Monel autoclave is charged with anhydrous, liquid hydrogen fluoride (100 gms., 5.0 moles). Glycerol (25.16 gms., 0.273 mole) is added slowly, with stirring, at approximately −10° C. The unit is sealed and the temperature is raised to 14° C. Oleic acid (39.5 gms., 0.141 mole) is then pumped in over fifteen minutes at 14° at 22° C. and stirring continued for an additional ten minutes at 20° to 22° C. The reactor is cooled to 10° C. and the reaction mixture carefully poured into 1500 ml. of cold water. One liter of ether is added and the organic phase separated and washed with eleven 250 ml. portions of salt water. The ether solution is dried over anhydrous $Na_2SO_4$ and stripped in vacuo to give 48.5 gms. (97.0% crude mass yield) of light yellow, viscous oil which solidifies on cooling.

Analysis: Acid value, 1.85; saponification equivalent =354.0 (theor. 354.6); iodine value, 38.4.

EXAMPLE II

Glycerol mono-($C_{12}$–$C_{15}$ alkanoate)

A 300 ml. Monel autoclave is charged with anhydrous, liquid hydrogen fluoride (200 gms., 10.0 moles). Glycerine (25.85 gms., 0.28 mole) and $C_{12}$–$C_{15}$ alkanoic acid (a mixture of branched chain acids wherein the alkyl chain predominantly ranges from 12 to 15 carbon atoms), (23.73 gms., 0.104 mole) are added slowly, with stirring, to the hydrogen fluoride at approximately −10° C. The unit is then sealed and the temperature raised to 60° C. with stirring for one hour. The reactor is cooled to −10° C. and the reaction mixture is carefully poured into 1500 ml. of cold water. One liter of ether is added and the organic phase separated and washed with seven 250 ml. portions of salt water. The ether solution is dried over anhydrous $Na_2SO_4$ and stripped in vacuo to give 29.4 gms. (93.5% crude mass yield) of yellow viscous oil.

Analysis: Acid value=0.65. Thin layer chromatographic analysis: monoester, 98%; diester, trace; triester, trace.

EXAMPLE III 1,6-hexandiol mono-($C_{10}$–$C_{11}$ alkanoate)

A 300 ml. Monel autoclave is charged with anhydrous, liquid hydrogen fluoride (200 gms., 10.0 moles). 1,6-hexanediol (47.3 gms., 0.4 mole) and $C_{10}$–$C_{11}$ alkanoic acid (a mixture of branched chain acids of 10 to 11 carbon atoms), (18.3 gms., 0.1 mole) are added slowly, with stirring, to the hydrogen fluoride at approximately −10° C. The unit is then sealed and the temperature raised to 60° to 65° C. for one hour. The reactor is cooled to 0° C. and the reaction mixture carefully poured into 1500 ml. of cold water. One liter of ether is added and the organic phase separated and washed with six 250 ml. portions of salt water. The ether solution is dried over anhydrous $Na_2SO_4$ and stripped in vacuo to give 28.9 gms. of yellow oil.

Analysis: Acid value=2.12. Thin layer chromatographic analysis: Monoester, 90%; diester, 7%; 1,6-hexanediol, 3%.

EXAMPLE IV

Trimethylolpropane monolaurate

A 300 ml. Monel autoclave is charged with anhydrous, liquid hydrogen fluoride (200 gms., 10.0 moles). Trimethylolpropane (37.5 gms., 0.28 mole) and lauric acid (20 gms., 0.10 mole) are added slowly, with stirring, to the hydrogen fluoride at approximately 0° C. The unit is then sealed and the temperature raised to 60° C. with stirring for one hour. The reactor is cooled to 0° C. and the reaction mixture carefully poured into 1500 ml. of cold water. One liter of ether is added and the organic phase separated and washed with seven 250 ml. portions of salt water. The ether solution is dried over anhydrous $Na_2SO_4$ and stripped in vacuo to give 31.9 gms. of yellow oil which solidifies on standing.

Analysis: Acid value=0.44. Thin layer chromatographic analysis: Monester, 99%; other components, trace.

EXAMPLE V

Transesterification of hydrogenated tallow with glycerine

A 300 ml. stirred Monel autoclave is charged with liquid, anhydrous hydrogen fluoride (125 gms., 6.25 moles) at 0° to 5° C. Glycerine (53.0 gms., 0.575 mole) is added to the hydrogen fluoride slowly over a twenty minute period at 0° to 5° C.. Hydrogenated tallow (a mixture of fatty acid esters from beef fat), (50.0 gms., 0.058 mole) is then added in one portion and the reactor secured. Stirring is started and the temperature raised to 35° to 45° C. for a period of three hours. After this, the reaction mixture is cooled to 15° C. poured into one liter of cold water and one liter of ether added. The organic phase is separated and washed with 250 ml. portions of salt water until the washings are neutral (usually five washings are required). The ether solution is dried over anhydrous sodium sulfate and stripped under reduced pressure to obtain a yield of 59.1 gms. (97.5% theory) of crude glycerol monostearate.

Analysis: Acid value (AV)=0.065. Saponification equivalent (SE)=350.1 (calcd., 351.4). Thin layer chromatographic analysis: Monoglyceride, 98.5%; diglyceride, 0.9%; triglyceride, trace; glycerine, 0.6%, gardner color: 3–4.

EXAMPLE VI

Transesterification of hydrogenated tallow with propanediol-1,2

A 600 ml. polyethylene beaker equipped with a magnetic stirrer and thermocouple is charged with liquid, anhydrous hydrogen fluoride (100 gms., 5 moles) at 0° to −5° C. Propanediol-1,2 (17.5 gms., 0.23 mole) is added dropwise with stirring over a period of seven minutes at 0° to 12° C. Hydrogenated tallow (20.0 gms., 0.023 mole) is then added in three minutes at 12° C. The temperature is raised to 20° C. and maintained there for twenty minutes, at which point the reaction mixture should become homogeneous. Stirring is continued for an additional two hours at 15° to 20° C. The reaction mixture is then poured into 1500 ml. of cold water and one liter of ether added. The organic phase is separated, washed with seven 250 ml. portions of salt water and dried over anhydrous sodium sulfate. The ether solution is stripped under reduced pressure to obtain a yield of 24.4 gms. of a white solid.

Analysis: Acid value (AV)=0.07. Thin layer chromatographic analysis: Monoesters, 90%; diesters, 3%; glycol, 7%.

EXAMPLE VII

Transesterification of hydrogenated tallow with trimethylolpropane

A 300 ml. Monel autoclave is charged with anhydrous, liquid hydrogen fluoride (180 gms., 9.0 moles). Trimethylolpropane (33.8 gms., 0.252 mole) and hydrogenated tallow (78.3 gms. 0.09 mole) are added slowly, with stirring, to the hydrogen fluoride at approximately −10° C. The unit is then sealed and the temperature raised to 60° to 65° C., for one hour. The reactor is cooled to 0° C. and the reaction mixture carefully poured into 1500 ml. of cold water. One liter of ether is added and the organic phase separated and washed with eight 250 ml. portions of salt water. The ether solution is dried over anhydrous $Na_2SO_4$ and stripped in vacuo to give 100.2 gms. (98.0% crude mass yield) of yellow oil which solidifies on standing.

Analysis: Acid value=0.12. Thin layer chromatographic analysis: Combined monoesters, 90%; other, 10%.

EXAMPLES VIII–XIV

Transesterification of hydrogenated tallow with glycerol

To determine process variables, a series of examples are run using the procedure of Example V. Table 2 summarizes the process variables and the results obtained:

TABLE 2

| Example [1] | Molar ratio, tallow: glycerol:HF | Time, hrs: min. | Temp., °C. | Monoglyceride [2] percent | Diglyceride [2] percent | Acid value | SE [3] | Crude mass yield percent |
|---|---|---|---|---|---|---|---|---|
| VIII | 1.0:10.0:109 | 3:15 | 35–45 | 98.5 | 0.9 | 0.06 | 350.1 | 97.5 |
| IX | 1.0:5.0:109 | 3:00 | 35–45 | 94.7 | 5.5 | 0.13 | 349.3 | 99 |
| X | 1.0:5.0:55 | 3:00 | 35–45 | 78.5 | 19.8 | 0.32 | 342.0 | 98 |
| XI | 1.0:2.0:100 | 3:00 | 60–70 | 86.7 | 9.4 | 0.08 | 346.8 | 98.4 |
| XII | 1.0:2.8:100 | 3:00 | 60–70 | 94.5 | 1.2 | 0.09 | 339.5 | 100 |
| XIII | 1.0:2.8:100 | 0:30 | 60–65 | 95.0 | 3.0 | 0.1 | 345.5 | 92.8 |
| XIV | 1.0:2.8:100 | 0:35 | 30–35 | 85.0 | 1.4 | 0.2 | 348.8 | 97.8 |

[1] Hydrogenated tallow.
[2] Mono- and diglyceride determined by quantitative thin layer chromatography techniques.
[3] Saponification equivalent (theoretical=351.4).

In comparing Examples VIII and X, it should be evident that the amount of monoester falls off considerably at molar ratios of hydrogenated tallow to HF less than 1.0:100. However, it should be noted that the conversion to monoester still remains well above that of prior art. Decreasing the mount of glycerol (Examples VIII, IX, XI and XII) does not seem to affect the amount of monoester until the stoichiometric amounts are approached (Example XI). Again, the conversion to monoester remains well above that obtained in the prior art. Reaction times as short as thirty minutes appear to be sufficient to effect the reaction even though longer reaction times may be used in some instances. The reaction temperature has a noticeable effect on conversion to monoester as is evident in Examples XIII and XIV. Decreasing the temperature from 60° to 65° C. to 30° to 35° C. lowers the conversion to monoester by 10%.

From the above, it should be evident that one of the most unique features of the process of this invention is its specificity toward production of monoesters. Most of the older methods for preparation of monoesters, employing either acid or base catalysts, usually resulted in an equilibrium distribution of mono-, di and triesters. For example, transesterification of hydrogenated tallow with large excesses of glycerol usually resulted in a mixture containing only 45% to 55% monoglyceride. While this conversion was improved somewhat (to about 65%) by the device of neutralizing the catalyst at a point in the reaction before equilibrium is attained, still the conversion was low. In contrast, this invention provides a method whereby high conversion (greater than 90%) of monoesters can consistently be obtained. Apparently, this is due to the use of anhydrous liquid HF in a dual role as reaction catalyst and reaction solvent. Virtually, only stoichiometric quantities of the reactants need be used.

It will thus be seen that the objects set forth above, among those made apparent from the preceding description, are efficiently attained, and since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed is:

1. A process for esterifying a member of the group consisting of a long chain fatty acid and a long chain fatty acid ester with a polyol to obtain the monoester derivative of the aliphatic acid or ester utilized comprising reacting said member of said group consisting of an aliphatic acid and an aliphatic acid ester with said polyol in the presence of substantially anhydrous liquid hydrogen fluoride, said hydrogen fluoride being present in a molar ratio of 50:1 to 150:1 to said acid.

2. The process of claim 1 wherein said reaction is run at a temperature of from 20° to 85° C.

3. The process of claim 1 wherein said reaction is effected by reacting said member of said group to said polyol over a time period of from ten minutes to six hours.

4. The process of claim 1 wherein the resultant monoester derivative is purified by the further step of pouring the reaction mixture into a large excess of water, adding an organic solvent to dissolve said monoester, separating the resultant solvent layer from the water, drying said layer and stripping the solvent to obtain a substantially pure monoester derivative.

5. The process of claim 1 wherein said member of said group is hydrogenated tallow.

6. The process of claim 1 wherein said member of said group is an aliphatic acid falling within the following formula:

$$CH_3(CH_2)_xCO_2H$$

where $x=6$ to 20.

7. The process of claim 1 wherein said member of said group is an aliphatic acid falling within the following formula:

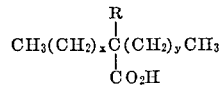

where R is a member of the group consisting of hydrogen and methyl radical, $x+y=3$ to 26 where $R=H$, and 2 to 25 when $R=-CH_3$.

8. The process of claim 1 wherein said polyol is glycerol.

References Cited

UNITED STATES PATENTS 2,383,581   8/1945   Arrowsmith et al. __ 260—410.7
3,383,404   5/1968   Miller et al. _____ 260—485

OTHER REFERENCES

Vogel, Practical Organic Chemistry, 3rd edition, 1955, pp. 44–45.

LORRAINE A. WEINBERGER, Primary Examiner
R. S. WEISSBERG, Assistant Examiner

U.S. Cl. X.R.
260—410.7, 488, 491